United States Patent Office 3,383,520
Patented May 14, 1968

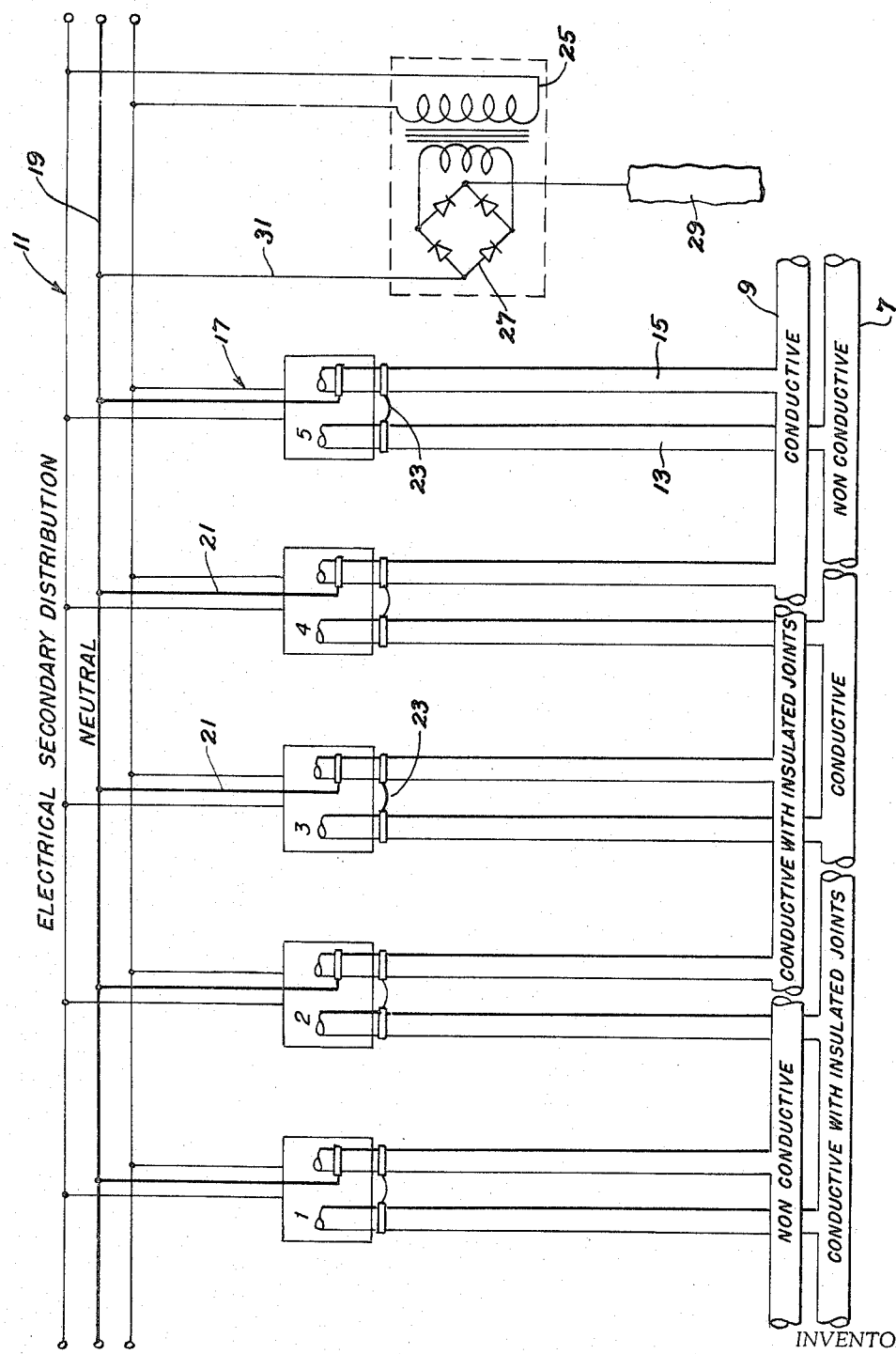

3,383,520
UTILIZATION OF THE ELECTRICAL NEUTRAL WITH CATHODIC PROTECTION
Arthur F. Hoffman, 637 Missouri St., Fairfield, Calif. 94533
Filed Mar. 9, 1964, Ser. No. 350,485
3 Claims. (Cl. 307—95)

The present invention relates to cathodic protection of structures whereby a plurality of conventional installations are metallically connected to provide cathodic protection to a plurality of facilities and structures serviced by the installations.

In conventional construction there is a network of underground utility structures. The water and gas pipes may be in electrical contact with each other at the customers' premises both accidentally and at gas water heaters. The neutral conductor of the electric circuit is normally grounded to the water pipe. Thus the water, gas, electric neutral, and other underground structures are normally bonded together and form an extensive network. Cathodic protection for such an underground network ordinarily comprises a sacrificial anode ground bed with a source of D.C. current such as a rectifier and a cathode lead connected to the protected structure.

There are three common types of utility mains in use: non-metallic, welded steel, and cast iron. Non-metallic, because of its very nature, needs not and cannot be protected electrically. Steel pipe, with welded joints, can be protected easily by attaching the cathode lead directly to the steel main. A cast iron main, having bell and spigot joints, offers no guarantee of electrical continuity through the joints. In order that the conventional method of attaching the cathode lead to the main be used, it is necessary to bond the joints. In order to bond the joints excavations would be necessary and excavations are not only economically and aesthetically impractical, but the bonding itself on cast iron is mechanically difficult.

In accordance with the present invention, the cathode lead from the rectifier is connected to the neutral conductor of the electric circuit rather than the conventional method of being connected to a main. Since the neutral conductor is grounded to the water pipe at each customer's premises, and the invention provides an electrical bond to structures to be protected, a continuous conductor to the underground network of all utilities is formed, thus providing multiple point current drainage for all underground structures. Since the neutral conductor is ordinarily above ground, the only excavation required is for the anode ground bed and anode cable.

The drawing schematically illustrates a conventional underground network of utilities servicing multiple units and employing the present invention.

The drawing shows a plurality of stations or buildings indicated 1 through 5. The buildings are serviced by gas and water mains 7 and 9 and an electric circuit 11 which are connected with each building respectively by pipes 13 and 15 and branch circuits 17. The electrical circuit includes a neutral conductor 19 connected by conductor lines 21 to each building and grounded to the water pipes as illustrated. The water and gas pipes 13 and 15 are schematically illustrated as being electrically connected as at 23.

A transformer is schematically illustrated at 25, a rectifier at 27 and an anode ground bed 29 connects with the rectifier. The rectifier includes a cathode lead 31 connected to neutral conductor 19.

In operation, rectifier 27 provides a forced drainage current to anode 29 draining current from all installations through neutral conductor 19. The fact that portions of gas and water mains 7 and 9 are nonconductive or joined with nonconductive joints, as indicated, becomes immaterial since drainage is provided through neutral conductor 19.

While the invention is described in certain detail and with reference to a preferred embodiment, it will be appreciated that certain modifications may be practiced without departing from the spirit of the invention. For example, it is possible to employ a galvanic anode, such as zinc, magnesium or aluminum. The galvanic potential between the structure and the anode will provide the current thus eliminating the need for a separate source of current such as a rectifier.

I claim:
1. In cathodic protection for underground structures including an electrical power circuit having a neutral conductor, a water pipe and a gas pipe electrically connected to said neutral conductor and a sacrificial anode, the improvement comprising a cathode lead connecting said neutral and sacrificial anode and a source of D.C. current disposed between said neutral conductor and anode.

2. In cathodic protection for underground structures servicing a plurality of stations including an electrical power circuit having a neutral conductor connecting with each station, a water pipe and a gas pipe connecting with each station and with said neutral conductor, and a sacrificial anode, the improvement comprising a cathode lead connecting said neutral conductor and said anode and a source of D.C. current disposed between said neutral conductor and anode.

3. In cathodic protection for underground structures including an electrical power circuit having a neutral conductor, a plurality of metallic underground structures, means connecting said structures and neutral conductor, and a sacrificial anode, the improvement comprising a cathode lead connecting said neutral conductor and anode and a source of D.C. current disposed between said neutral conductor and anode.

References Cited

UNITED STATES PATENTS

| | | | |
|---|---|---|---|
| 1,481,289 | 1/1924 | Jones | 307—95 |
| 1,962,696 | 6/1934 | Rhodes | 174—6 X |

OTHER REFERENCES

Kulman: Corrosion Control of Underground Power Cables in N.Y., A.I.E.E. Transactions, vol. 73, pages 750–751.

Schaeffer: Electrical Grounding Systems and Corrosion, A.I.E.E. Transaction, vol 74, pages 78–80.

ORIS L. RADER, *Primary Examiner.*

T. J. MADDEN, W. E. DUNCANSON,
*Assistant Examiners.*